(12) United States Patent
Schendel

(10) Patent No.: US 8,579,569 B2
(45) Date of Patent: Nov. 12, 2013

(54) RETAINING CAM FOR A ROTARY FASTENER

(75) Inventor: Olav Schendel, Stuttgart (DE)

(73) Assignee: SFS intec Holding AG, Heerbrugg (CH)

( * ) Notice: Subject to any disclaimer, the term of this patent is extended or adjusted under 35 U.S.C. 154(b) by 640 days.

(21) Appl. No.: 12/744,593

(22) PCT Filed: Nov. 24, 2008

(86) PCT No.: PCT/EP2008/066078
§ 371 (c)(1),
(2), (4) Date: May 25, 2010

(87) PCT Pub. No.: WO2009/071459
PCT Pub. Date: Jun. 11, 2009

(65) Prior Publication Data
US 2010/0260574 A1      Oct. 14, 2010

(30) Foreign Application Priority Data
Dec. 7, 2007      (DE) .......................... 10 2007 059 148

(51) Int. Cl.
*F16B 39/284*      (2006.01)
(52) U.S. Cl.
USPC ........... 411/111; 411/103; 411/533; 411/537; 411/538
(58) Field of Classification Search
USPC .................. 411/103, 105, 111, 533, 537–538
See application file for complete search history.

(56) References Cited

U.S. PATENT DOCUMENTS

| | | | | |
|---|---|---|---|---|
| 2,367,812 A | * | 1/1945 | Venditty | 411/554 |
| 2,789,457 A | * | 4/1957 | Allen | 411/432 |
| 2,815,789 A | * | 12/1957 | Hutson et al. | 411/111 |
| 2,820,499 A | * | 1/1958 | Schaaf | 411/103 |
| 2,991,816 A | | 7/1961 | Harbison et al. | |
| 3,382,630 A | * | 5/1968 | Chivers | 52/208 |
| 3,422,721 A | * | 1/1969 | Yonkers | 411/369 |
| 3,695,324 A | * | 10/1972 | Gulistan | 411/111 |
| 4,125,140 A | * | 11/1978 | Basile | 411/106 |
| 4,324,517 A | * | 4/1982 | Dey | 411/353 |
| 4,594,040 A | | 6/1986 | Molina | |
| 4,616,967 A | * | 10/1986 | Molina | 411/105 |
| 5,146,668 A | * | 9/1992 | Gulistan | 29/525 |
| 5,326,206 A | | 7/1994 | Moore | |
| 2004/0101384 A1 | * | 5/2004 | Schilling et al. | 411/537 |

FOREIGN PATENT DOCUMENTS

| | | |
|---|---|---|
| DE | 1400774 | 12/1968 |
| DE | 3735250 | 4/1988 |
| GB | 786644 | 11/1957 |

* cited by examiner

Primary Examiner — Roberta Delisle
(74) Attorney, Agent, or Firm — Volpe and Koenig, P.C.

(57) ABSTRACT

A retaining cam (20) for a rotatable fastener for connecting components (16, 17) is provided. The retaining cam (20) has a housing (22) pivotally supported on a base plate (24), by which the retaining cam (20) can be fixedly connected to one (17) of the components (16, 17). A screw (30) is secured rotationally fixed in the housing (22). A fastener bolt (40) rotatably connected to another (16) of the components (16, 17) can be screwed onto the screw (30). Spring elements are associated with the screw (30) for generating an elastic pretension for securing the fastener bolt (40) against rotation. The housing (22) is pivotally supported on the base plate (24) by a spherical washer (50). An angle deviation between the center axes of the retaining cam (20) and the fastener bolt (40) can be compensated for by pivoting the retaining cam on the spherical washer (50) while maintaining full-surface contact of the retaining cam (20).

6 Claims, 6 Drawing Sheets

Detail A

RETAINING CAM FOR A ROTARY FASTENER

BACKGROUND

The invention relates to a retaining cam for a rotatable fastener to connect components, with the retaining cam comprising a housing, which is pivotally supported on a base plate, by which the retaining cam can be connected to one of the components in a fixed manner, and into which a screw is inserted in a rotationally fixed fashion, onto which a fastener bolt can be screwed, rotationally connected to one of the other components, with at least one spring element being allocated to the screw for creating an elastic pretension for rotationally securing the fastener bolt.

A rotatable fastener of the above-mentioned type is a standard part in aeronautics and space exploration. The retaining cam of this rotatable fastener complies with the standard prEN 6092 of AECMA (The European Association of Aerospace Industries-Standardization, Brussels, Belgium, Edition P1, draft dated Mar. 22, 2004.) The fastener bolt of the rotatable fastener complies with the standard prEN 6088 of AECMA (Edition P1, April 2006.) Such rotatable fasteners are used in aeronautics and space exploration to transfer strong forces, for example a maximum tensile stress of 6300 N and a maximum shearing force of 11,000 N. These known rotatable fasteners are used in an aircraft, for example for a detachable connection of an interior cover panel or an access panel to the fuselage frame or a cell. The retaining cam is fastened via its base plate to the fuselage frame, for example via rivets. The fastener bolt is connected to an interior cover panel or an access panel in a rotational but captive fashion. The fastener bolt has a bore with a double-threaded internal thread. The screw inserted into the retaining cam in a rotationally fixed fashion has a double-threaded external tread. A perfect connection of the fastener bolt to the retaining cam can only be created in prior art when their axes are aligned to each other, e.g., when two components to be connected to each other are parallel in reference to each other. Such alignment of the axes or the parallel positioning of the components may already be difficult due to permissible tolerances per se. During the assembly, the fastener bolt will pull the retaining cam, which is pivotal to a certain extent in reference to the base plate, against said base plate. When the axes are not aligned to each other, the retaining cam will attempt to pull itself with its circular contact area, which encompasses a facial opening of its housing facing the fastener bolt, against the base plate, with the retaining cam attempting to align said contact area to the base plate parallel in reference to the fuselage frame. If the axes fail to assume a perpendicular position in reference to the fuselage frame tensions can develop in the rotatable fastener, because the retaining cam will not contact the base plate over its entire area. This insufficient contact can even lead to the housing of the retaining cam, which is embodied relatively thinly, becoming damaged. Furthermore, there are applications in which curved interior cover panels shall be fastened at the fuselage frame. Previously, particular expenses incurred to appropriately position the fastener cams at the frame side for a screwed connection to the fastener bolt, prevent the occurrence of the above-mentioned tensions or the above-mentioned damage of the housing of the retaining cam. Additionally, particular expenses are necessary for the retaining cam to contact the base plate with its entire contact area, within permissible tolerances, when screwed to the fastener bolt. This is even further aggravated in that such rotatable fasteners are designed for frequent reusability. Commonly such a rotatable fastener should withstand 1500 screw cycles.

Quarter-rotation fasteners are known (for example from the catalog Alcoa Fastening Systems, 2007), in which the above-mentioned difficulties are avoided such that the retaining cam is connected via the base plate to the fuselage frame or the like in a stiff fashion and that a fastener pin is inserted, which at its frontal end comprises a Phillips pin. During fastening, the Phillips pin of the fastener pin glides over a ramp of the retaining cam and after a quarter rotation reaches a catch position, in which it is held by the elastic pretension of a spring element. Such a rotatable fastener shows a simple design and can easily be assembled; however it is only useable for considerably lower tensile stress applications.

SUMMARY

The object of the invention is to provide a retaining cam of the type mentioned at the outset that allows greater angular deviations between its axis and the axis of the fastener pin to be compensated without any problems.

This object is attained according to the invention in that the housing of the retaining cam is supported on the base plate in a pivotal fashion via a spherical washer. In the retaining cam according to the invention it is ensured, here, that the retaining cam always contacts an area holohedrally over its entire perimeter. This is allowed by the spherical washer, arranged between the base plate and the adjacent face of the housing of the retaining cam, on which the housing can be pivoted until the axis of the screw of the retaining cam and the axis of the fastening pin are aligned to each other. Here, although the retaining cam can take a diagonal position in reference to the base plate, however, it maintains its holohedral contact at the spherical washer, which on its opposite side has a planar area, via which it upholds a holohedral contact to the base plate. It is obvious that the angular deviation of axes, which are not aligned and can be compensated thereby, must be within a limited range, however that within said limited range always a holohedral contact of the retaining cam to the base plate remains ensured (via the spherical washer), contrary to prior art, where even a minor angular deviation may lead to canting and thus prevent a holohedral contact of the retaining cam to the base plate. A rotatable fastener equipped with the retaining cam according to the invention also allows the fastening of curved panels or the like to the fuselage frame without any problems. Due to the fact that variable angular deviations can be compensated, fewer expenses are incurred at the structure to fasten the retaining cam in the correct position. In general, the retaining cam according to the invention allows an additional way to compensate tolerances.

Further advantageous embodiments of the retaining cams according to the invention are described in the dependent claims.

When in an embodiment of the retaining cam according to the invention of a facial opening of the housing, adjacent to the base plate, is provided with supporting projections diametrically opposed each other, which engage the neighboring support openings of the base plate, the spherical washer can easily be arranged between the base plate and the housing by simply embodying the support openings of the base plate in an appropriately larger size.

When in another embodiment of the retaining cam according to the invention the spherical washer is provided with another diametrically opposite additional support projection, also engaging the support openings of the base plate, the assembly and fastening of the spherical washer is facilitated between the base plate and the housing.

In another embodiment of the retaining cam according to the invention, a contact area of the housing, extending around the face of the opening, is embodied complementary in reference to the spherical area of the spherical washer so that the holohedral surface contact of the housing is always ensured regardless of the angular position of the housing in reference to the base plate.

In another embodiment of the retaining cam according to the invention, the housing is pivotal by a total of 10° in reference to a central plane extending through the center of the support plate and the support openings, so that according to experience the range of angular deviations expected in practices is covered.

In another embodiment of the retaining cam according to the invention, the housing is pivoted by a total of 10° around an axis extending perpendicular in reference to a central plane, the retaining cam can compensate arbitrary angular deviations between the axes of the rotatable fastener parts to be screwed together.

In another embodiment of the retaining cam according to the invention, the ability of the housing to pivot is enabled by sufficient play of at least the supporting projections of the housing in the support openings of the base plate, and the retaining cams require only minor modifications from the standard embodiment, except for the additionally provided spherical washer, by selecting appropriately greater support openings of the base plate.

In another embodiment of the retaining cams according to the invention, the screw inserted in the housing comprises a high-strength material, so that higher forces can easily be transferred compared to using with conventional retaining cams. In this case, beneficially the rotatable fastener is also made from a high-strength material.

BRIEF DESCRIPTION OF THE DRAWINGS

In the following, exemplary embodiments of the invention are described in greater detail using the drawings. They show.

DETAILED DESCRIPTION OF THE PREFERRED EMBODIMENTS

Figure 1:
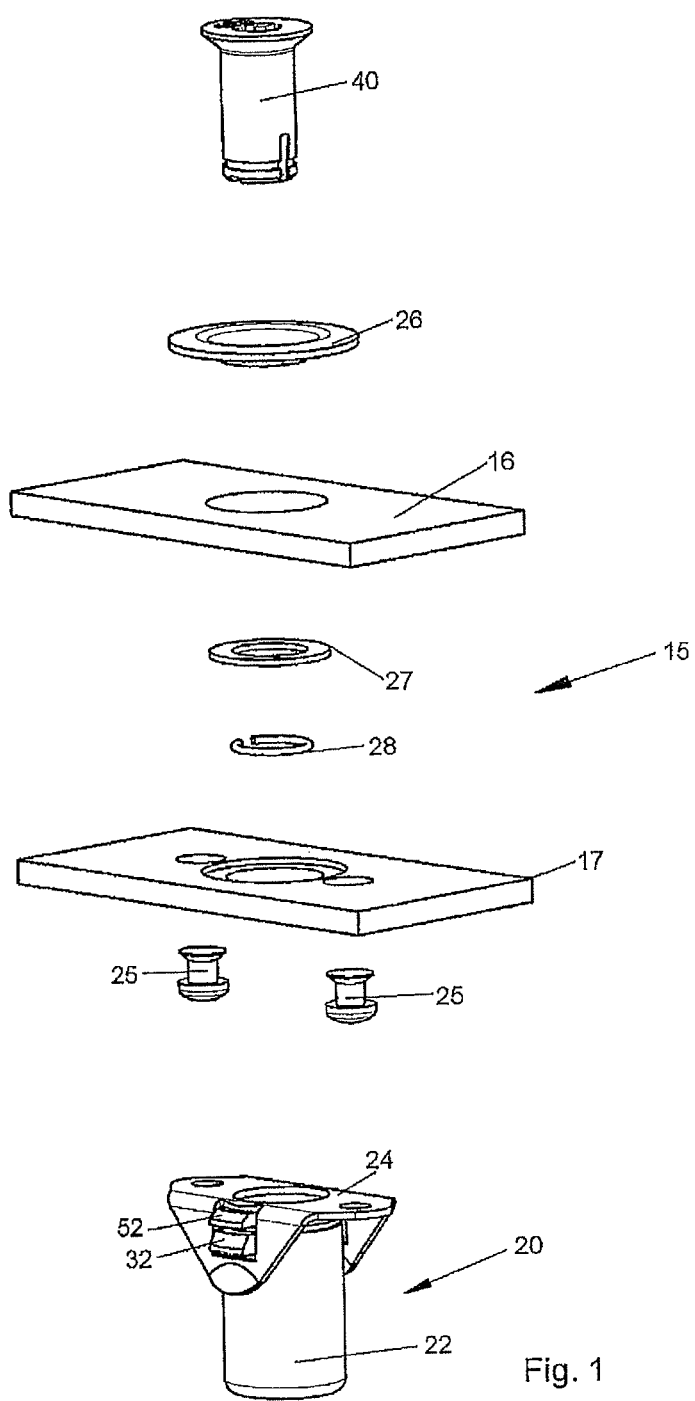
FIG. 1 is an exploded perspective view of a rotatable fastener comprising a retaining cam according to the invention and two components to be connected therewith.
Figure 2:
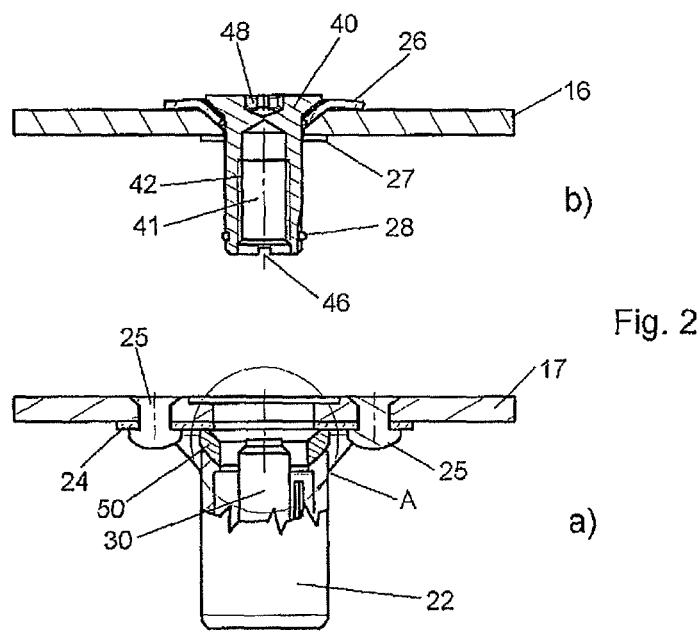
FIG. 2 is a partially longitudinal cross-sectional view of a rotatable fastener comprising a retaining cam according to the invention, namely in FIG. 2a a retaining cam fastened at a fuselage frame and in FIG. 2b a fastening pin fastened at an interior cover panel.
Figure 3:
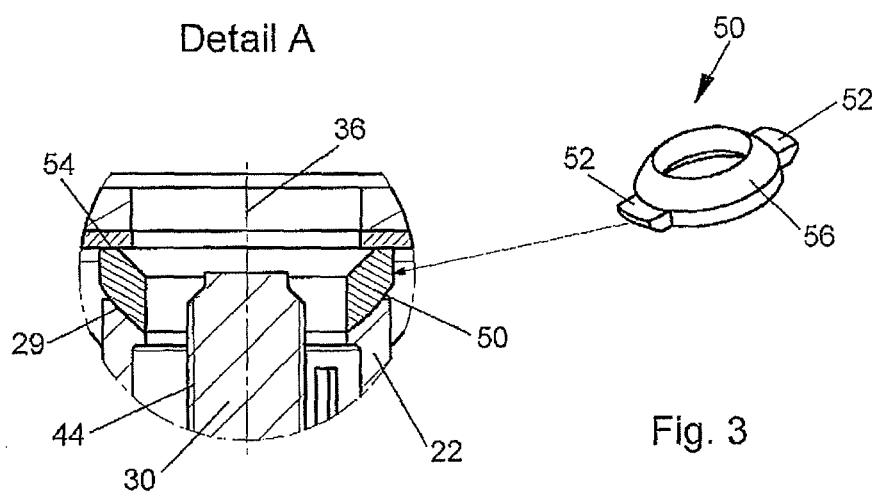
FIG. 3 is a detail A of the indicated area in FIG. 2a, FIG. 4 is two side views of the rotatable fastener according to FIG. 1, offset by 90° in reference to each other, (omitting the components connected therewith), the maximally possible pivotal position of the exemplary embodiment of the retaining cam according to the invention shown in reference to its base plate.

In a perspective and exploded view, FIG. 1 shows a rotatable fastener, in its entirety marked 15, for connecting two components 16 and 17 under elastic pre-tension. The component 16 may be an interior cover panel in the cabin of an airplane, with then the component 17 symbolizing the fuselage frame. The rotatable fastener 15 comprises a retaining cam, in its entirety marked 20, and a fastening pin 40. According to the illustration in FIGS. 2a and 2b, which are additionally being referenced in the following, the retaining cam 20 comprises a housing 22 and a base plate 24, on which the housing 22 is supported in a pivotal fashion. Via the base plate 24 the retaining cam 20 can be connected to the component 17 in a fixed fashion, in the exemplary embodiment shown with the help of two rivets 25. FIG. 2a shows the finished rivet connection. The fastening pin 40 is held rotational but captively in a bore in the component 16, namely with the help of two washers 26, 27 and cir-clip 28. A screw 30 (FIG. 2a) is inserted in a rotationally fixed fashion into the housing 22 of the retaining cam 20, which is explained in greater detail in the following. According to FIG. 2b, the fastening pin 40 comprises a bore 41 with an internal thread 42, by which it can be screwed onto an external thread 44 of the screw 30, shown in FIG. 3. According to the illustration in FIGS. 2 and 3 the housing 22 is supported on the base plate 24 via a spherical washer 50 in a pivotal manner. It is now described in greater detail with reference to the illustrations of the other FIGS. 5-14.

Figure 4:
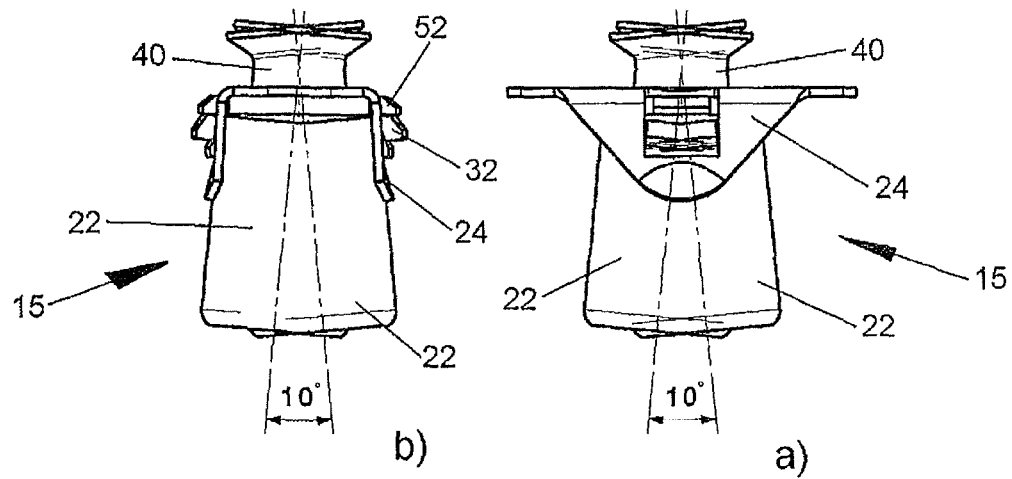
Figure 5:
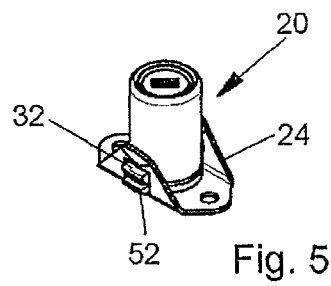
FIG. 5 is a perspective view of the retaining cams according to the invention in a view from the bottom.
Figure 6:
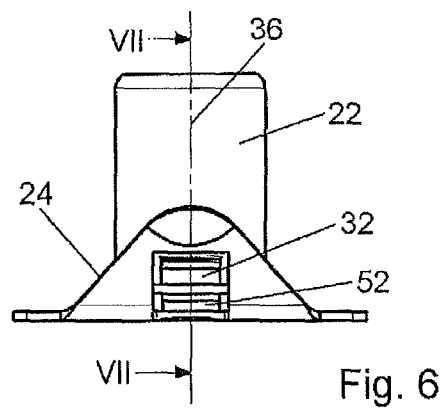
FIG. 6 is a side view of the retaining cams according to FIG. 5.

FIG. 5 shows the retaining cam 20 in a perspective illustration in a view from the bottom. FIG. 6 shows the retaining cam 20 in a side view, FIG. 7 in a longitudinal cross-section according to the line VII-VII in FIG. 6, and FIG. 8 in an exploded illustration. At a facial opening adjacent to the base plate 24 the housing 22 is provided with two diametrically opposite support projections 32, which engage two neighboring support openings 34 of the base plate 24. The spherical washer 50 is provided with additional support projections 52 diametrically opposite each other, which also engage the support openings 34 of the base plate 24, as discernible in FIGS. 4-7. The support openings 34 of the base plate 24 are sized such that the housing 22 is pivotal by a total of 10° in reference to a central plane extending through a center 36 of the support plate 24 and the support openings 34. Due to this construction the retaining cam 20 allows an angular compensation of up to 5° per side. FIG. 4 shows in two side views of the rotatable fastener 15 according to FIG. 1, which are off-set by 90° in reference to each other, (and omitting the components 16, 17 that are to be connected to each other) the maximally possible pivotal positions of the exemplary embodiment of the retaining cam 20 shown in reference to its base plate 24. In FIGS. 4a and 4b the rotatable fastener 15 is shown pivoted by 5° to the left and by 5° to the right each, i.e. by 10° each, respectively. The ability of the housing 22 of the retaining cam 20 to pivot is allowed by sufficient play of at least the supporting projections 32 of the housing 22 in the support openings 34 of the base plate 24. It is generally sufficient for the support projections 32 of the housing 22 to have sufficient play, because the spherical washer 50 remains compressed to the bottom of the base plate 24 when the housing 22 is pivoted in reference to the base plate 24 and thus the support projections 32 are pivoted in the support openings 34.

Figure 9:
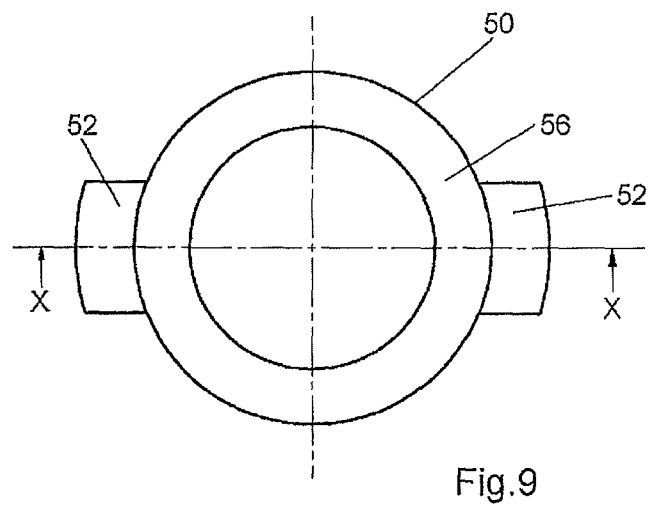
FIG. 9 is a top view of a spherical washer of the retaining cam according to the invention showing the spherical area.
Figure 10:
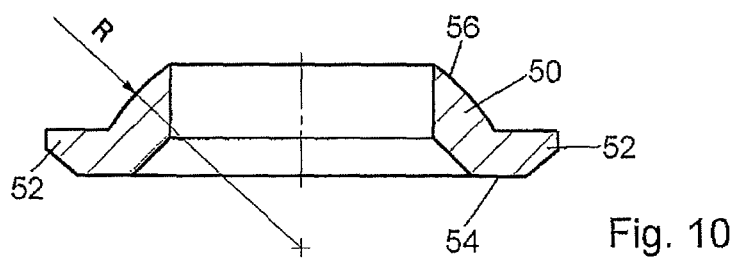
FIG. 10 is a cross-sectional view of the spherical washer taken along the line X-X in FIG. 9.

In order to ensure the contact of the spherical washer 50 to the base plate 24 and the pivotal holohedral contact of the housing 22 to the spherical washer 50, the spherical washer comprises, according to the illustration in FIGS. 9 and 10, a plane area 54 and on its side opposite the plane area a spherical area 56, having a radius of curvature R. More precisely, the spherical area 56 represents the circular surface of a section of a sphere having the radius R. According to the illustration in FIGS. 12-14, a contact surface 29 of the housing 22, extending around a facial opening 23, adjacent to the base plate 24, is embodied complementary to the spherical surface 56 of the spherical washer 50, i.e. it has the same radius of curvature R. Regardless of the angular position of the housing 22 in reference to the base plate 24, the housing 24 remains in a holohedral contact to the spherical washer 50 and thus, via the plane area 54, also in a holohedral contact to the base plate 24 when the axis of the fastener bolt 50 and the central axis 36 of the screw 30 and thus the housing 22 are aligned to each other, however said axes are not perpendicular in reference to the base plate 24.

Figure 7:
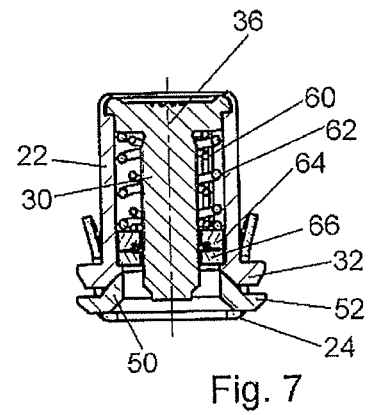
FIG. 7 is a cross-sectional view of the retaining cams according to the invention taken along the line VII-VII in FIG. 6.
Figure 8:
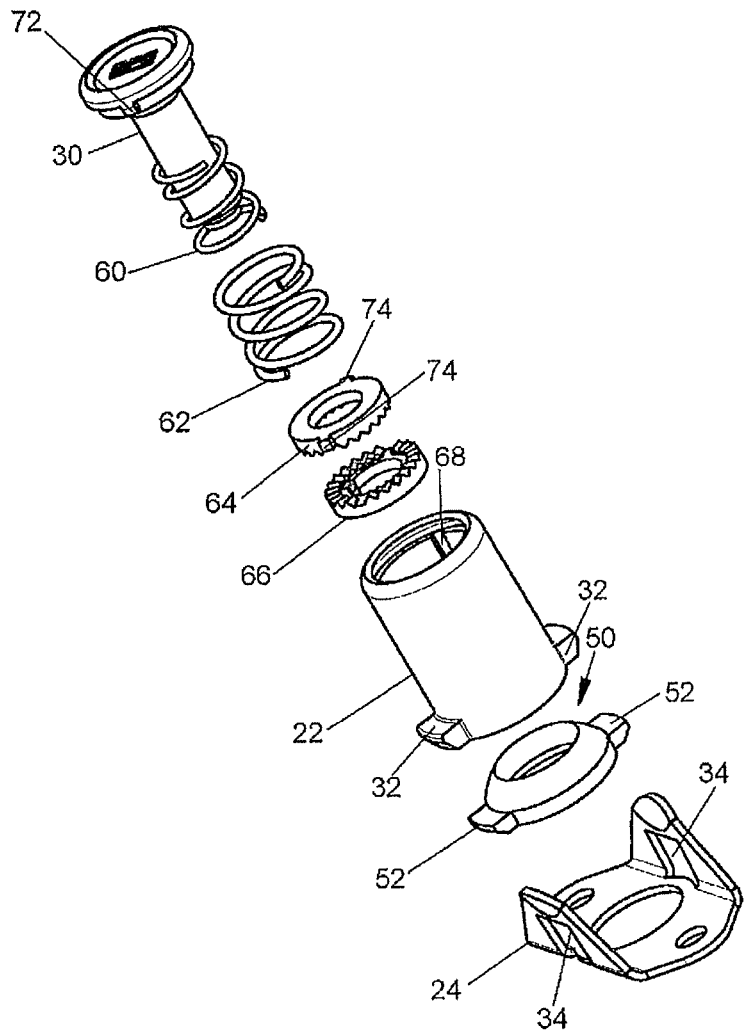
FIG. 8 is an exploded perspective view of the retaining cam according to the invention.
Figure 11:
FIG. 11 is a perspective view of a housing of the retaining cam according to the invention.
Figure 12:
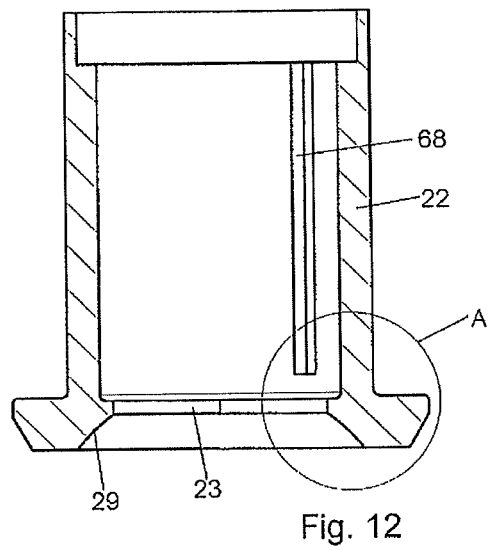
FIG. 12 is a longitudinal cross-sectional view of the housing according to FIG. 11.
Figure 13:
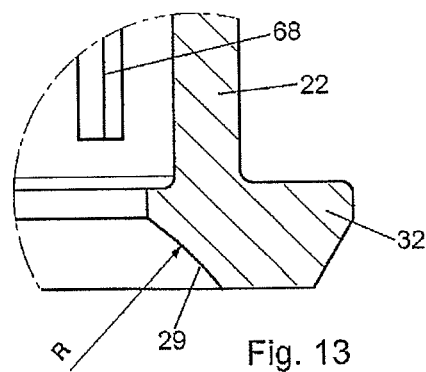
FIG. 13 is a detail A of the illustration in FIG. 12.
Figure 14:
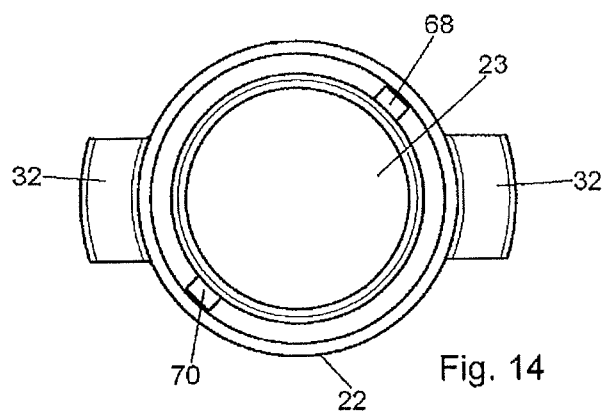
FIG. 14 is a top view of the housing according to FIG. 12.

The assembly of the retaining cam 20 according to the invention differs from the assembly of the standard retaining cam of the type mentioned at the outset primarily such that the spherical washer 50 is additionally to be inserted between the housing 22 and the base plate 24. Prior to the assembly the housing 22 is completely cylindrical at the end opposite the support projections 32, i.e. it is embodied as shown in FIG. 11, however differing from the one shown in FIGS. 7 and 8. Namely, during the assembly first the screw 30 is inserted into the housing 22 together with two helical compression springs 60 and 62 having small and/or large diameters and two sprockets 64 and 66, embodied with teeth at their facing sides. At its interior the housing 22 has two diametrically opposite grooves 68, 70. The screw 30 and the sprocket 64 each have two radial projections 72 and/or 74, diametrically opposite each other, with only one of the two projections 72 being visible in FIG. 8. During the assembly the projections 72 and 74 are inserted into the grooves 68, 70 and prevent any rotation of the screw 30 and/or the sprocket 64. When the screw 30 is inserted into the housing 22 to such an extent as shown in FIG. 7, the exterior circumferential perimeter of the housing 72, initially embodied cylindrical, is compressed inwardly as shown in FIGS. 7 and 8 in order to encompass the screw 30 in the housing 22. Here, the sprocket 64 remains axially displaceable; the same applies to the sprocket 66, with its teeth engaging the teeth of the sprocket 64 in a detachable, form-fitting manner. The sprocket 66 has at its lower face, shown in FIG. 8, two catching protrusions engaging a groove 46 in the face of the fastener bolt 40 in a form-fitting fashion, when the fastener bolt 40 is screwed onto the screw 30 of the retaining cam 20. In order to allow rotation, at the end opposite the groove 46, the fastener bolt 40 comprises a TORX style connection 48. When rotated the fastener bolt 40 entrains the sprocket 66. During the rotation of the sprocket 66 the sprocket 64 can be deflected in the axially opposite direction, due to the springs 60 and 62 such that the sprocket 66 moves like a ratchet over the sprocket 64 until the fastener pin 40 has reached its final position. The ultimately remaining, elastically pre-tensioned mutual engagement of the teeth of the sprockets 64, 66 ensures that the screwed connection between the fastener bolt 40 and the retaining cam 20 cannot unintentionally loosen, even under strongest stress or vibration of the rotatable fastener 15. The elastic pre-tension necessary to prevent any rotation of the rotatable fastener 40 is applied by the springs 60, 62.

The base plate 24 has two approximately perpendicularly bent support eyelets, in which the support eyelets 34 are embodied diametrically opposite in reference to each other. Successively, the spherical washer 50 with its support projections 52 and the housing 22, in which the above-described components have been assembled, are also inserted in the support openings 34 with their support projections 52, 32. The support projections 52 and 32 can be inserted on a side into the support opening 34. Subsequently, pressure can be applied at the opposite side by the opposite support projections 52 and 32 onto the adjacent support eyelet, with the support eyelet elastically deflecting and allowing the support projections 52 and 32 to pass until they have been accepted by the allocated support opening 34. The play of at least the support projections 32 in the support openings 34 is here sized such that the housing 22 can be pivoted relative to the central plane extending through the center of the support plate 24 and the support openings 34 and around an axis extending perpendicular in reference to the central plane by a total of up to 10° each. The cross-sectional line VII-VII according to FIG. 6 is located in the above-mentioned central plane of the cross-sectional illustration in FIG. 7.

The screw 30 inserted into the housing 22 comprises a high-strength material, preferably a high-strength stainless steel, which is malleable for producing the external thread 44. The external thread 44 produced by cold processing is subsequently hardened and additionally coated with a sliding lacquer. Suitable are, for example, the material 1.4016/DIN EN 10263-5. Preferably the fastener bolt 40 is also made from stainless steel, with here rather a steel being used that can be processed in a cutting fashion. The material 1.40301/EN 10088-3A is a suitable material for the base plate 24.

LIST OF REFERENCE CHARACTERS

15 Rotatable fastener
16 Component
17 Component
20 Retaining cam
22 Housing
23 Facial opening
24 Base plate
25 Rivet
26 Washer
27 Washer
28 Cir-clip
29 Support area
30 Screw
32 Support projection
34 Support openings
36 Central axis
40 Fastening bolt
41 Bore
42 Internal thread
44 External thread
46 Groove
48 TORX-style connection
50 Spherical washer
52 Support projections
54 Plane area
56 Spherical surface
60 Pressure spring
62 Pressure spring
64 Sprocket 66 Sprocket
68 Groove
70 Groove
72 Radial projections
74 Radial projections

The invention claimed is:

1. A retaining cam with a rotatable fastener to connect components, with the retaining cam comprising a housing which is supported in a pivotal fashion on a base plate, via which the retaining cam can be connected in a fixed manner to one of the components, and a screw is inserted in the housing in a rotationally fixed fashion, onto which the rotatable fastener which comprises a fastening bolt, rotationally connected to the other of the components, can be screwed, with the screw being allocated to at least one spring element for creating an elastic pre-tension for locking the fastening bolt, and the housing (22) is pivotally supported via a spherical washer (50) on the base plate (24), the fastening bolt having an internal bore with a thread in which the screw is engagable, and two washers and a clip for retaining the fastening bolt in the other component, the fastening pin and the housing (22) are connectable in a position in which axes thereof are positioned at an angle offset from perpendicular to surfaces of the components being joined and are pivotable by a total of 10° in reference to a central plane extending through a center of the base plate (24) and the support openings (34), and are pivotable by a total of 10° around an axis extending perpendicular in reference to the central plane.

2. A retaining cam with a rotatable fastener according to claim 1, wherein the housing (22) is provided at a facial opening (23) adjacent to the base plate (24) with diametrically opposite support projections (32), which engage adjacent support openings (34) of the base plate (24).

3. A retaining cam with a rotatable fastener according to claim 2, wherein the spherical washer (50) is provided with additional support projections (52), diametrically opposite each other, which also engage the support openings (34) of the base plate (24).

4. A retaining cam with a rotatable fastener according to claim 2, wherein a support area (29) of the housing (22), extending around the facial opening (23), is embodied complementary in reference to a spherical surface (56) of the spherical washer (50).

5. A retaining cam with a rotatable fastener according to claim 1, wherein an ability to pivot the housing (22) is allowed by sufficient play of at least the support projections (32) of the housing (22) in the support openings (34) of the base plate (24).

6. A retaining cam with a rotatable fastener according to claim 1, wherein the screw (30) inserted into the housing (22) comprises a high-strength material.

* * * * *